Sept. 8, 1964
J. A. DUCEY
3,147,762
DEVICE FOR SILENCING WATER FLOWING INTO
STORAGE TANK OF WATER CLOSET
Filed Jan. 19, 1960
3 Sheets-Sheet 3
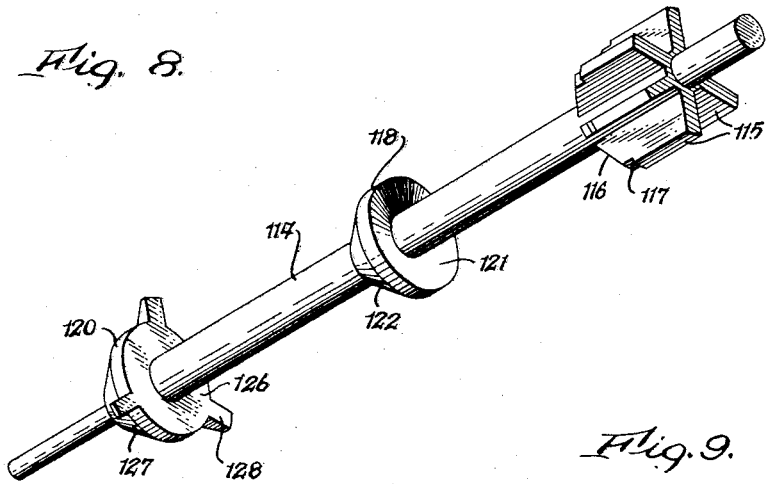
Fig. 8.
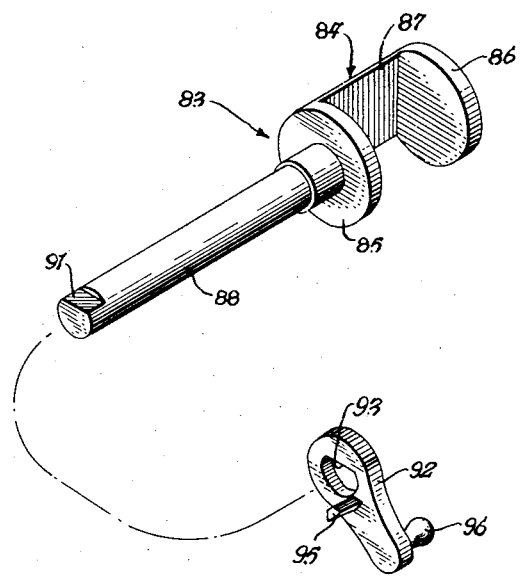
Fig. 9.
Fig. 10.
INVENTOR
James A. Ducey
BY Popp and Sommer
ATTORNEYS

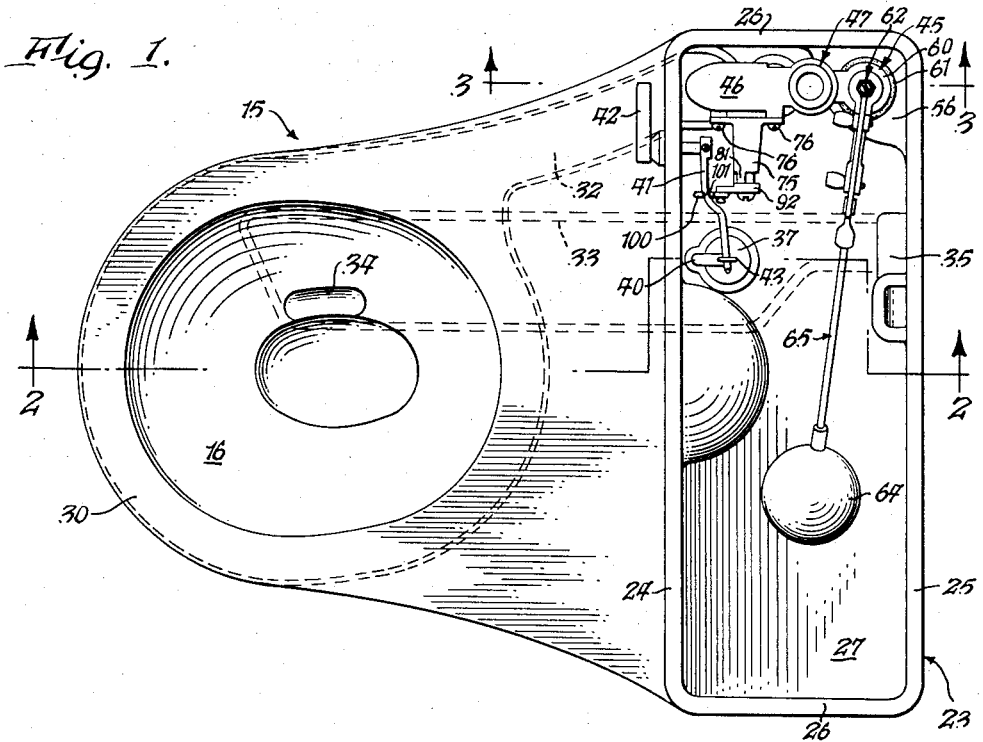
Sept. 8, 1964     J. A. DUCEY     3,147,762
DEVICE FOR SILENCING WATER FLOWING INTO
STORAGE TANK OF WATER CLOSET
Filed Jan. 19, 1960     3 Sheets-Sheet 1
INVENTOR
James A. Ducey
BY Popp and Sommer
ATTORNEYS INVENTOR
James A. Ducey
BY Popp and Sommer
ATTORNEYS.

United States Patent Office 3,147,762
Patented Sept. 8, 1964

3,147,762
DEVICE FOR SILENCING WATER FLOWING INTO STORAGE TANK OF WATER CLOSET
James A. Ducey, Robinson, Ill., assignor to Ogden Corporation, New York, N.Y., a corporation of Delaware
Filed Jan. 19, 1960, Ser. No. 3,420
2 Claims. (Cl. 137—216)

This invention relates to improvements in the water supply system of a water closet including a storage tank and a rim flush, and more particularly to a device for silencing water flowing into the storage tank.

It is an object of the invention to provide a silencer device which is effective in overcoming the objectionable noise of the water flowing into the storage tank, and for this purpose incorporates novel water dividing means and novel water dispersing means.

Another object is to provide a silencer device which is also effective in preventing siphoning of water from the storage tank back into the water supply.

Still another object is to provide a silencer device which is simple in construction in that it contains no moving parts, and which silencer device is easily assembled and disassembled, as well as readily attachable and detachable from the water supply system of the closet.

Other objects and advantages of the invention will become apparent upon consideration of the following detailed description together with the accompanying drawings, wherein:

FIG. 1 is a top plan view of a water closet including a bowl, a rim flush for the bowl, a storage tank with the lid removed, and a water supply system containing the diverter valve assembly and the silencer device embodying the invention;

FIG. 2 is an elevational sectional vew taken on line 2—2 of FIG. 1, but illustrating the tank lid in place;

FIG. 8 is an enlarged perspective view of the silencer rod including the water dividing fins and the water dispersing collars;

FIG. 9 is an enlarged perspective view of the diverter valve, and

FIG. 10 is an enlarged perspective view of the lever arm reversed and removed from its mounting on the diverter valve spindle.

Figure 3:
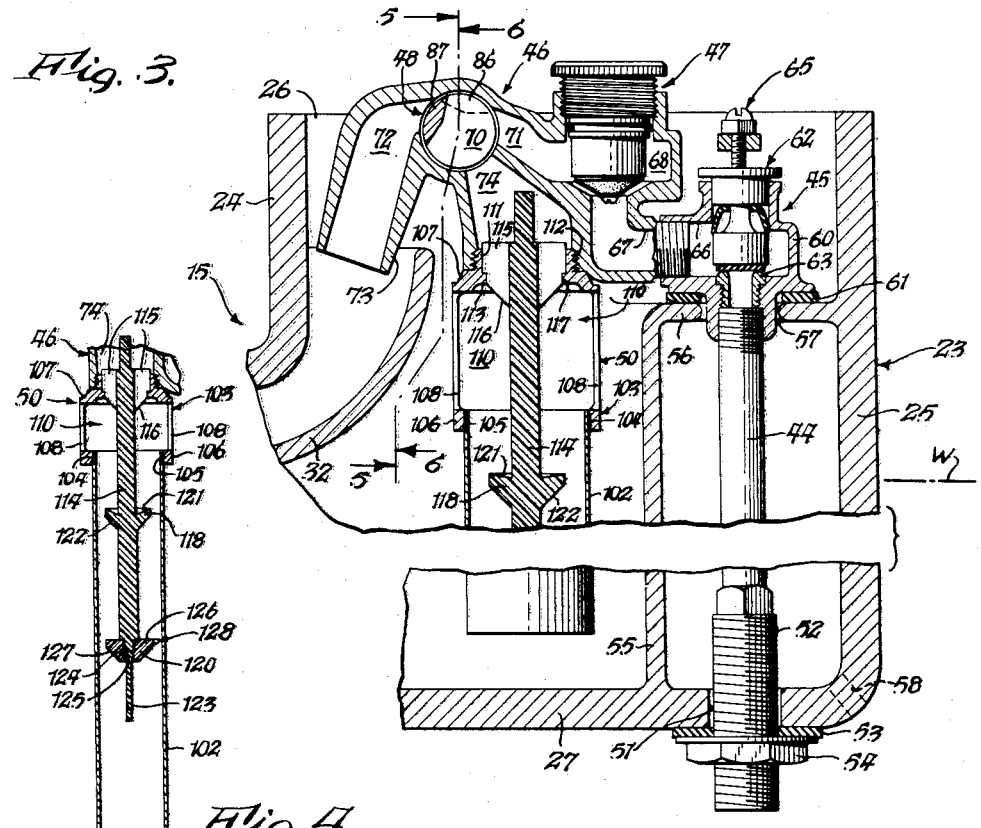
FIG. 3 is an enlarged partial elevational sectional view taken on line 3—3 of FIG. 1, and illustrating a portion of the inventive diverter valve assembly including the chamber forming body and the rotary diverter valve head arranged therein, and the upper portion of the inventive silencer device including the hush tube, air-gap forming cage and silencer rod therein.

Referring to the drawings, and particularly to FIGS. 1 and 2, the numeral 15 represents a water closet which is composed of a vitreous china bowl 16 supported on a pedestal 17 having arranged therein the usual trap including the upwardly and rearwardly extending leg 18, the downwardly extending leg 20, and a laterally extending portion 21 leading to a downwardly facing outlet 22.

A vitreous china tank 23 is shown as being formed integrally with the bowl 16 and extends rearwardly therefrom and also laterally to a greater width than the bowl, as best seen in FIG. 1. The tank 23 includes rear, side and bottom walls 25, 26 and 27 respectively. The rear portion of the bowl 16 and the trap form the lower front wall portion of tank 23, the upper front wall section 24 being provided above the bowl. A removable lid or cover 28 closes the upper end of tank 23.

Surrounding the top of bowl 16 is a hollow rim 30 provided with a series of apertures 31 adapted to direct streams of water downwardly along the inner surface of the bowl. As also shown in FIG. 1, the rear of rim 30 connects with a conduit 32 which extends into the tank 23 and is adapted to be connected with the water supply system, as hereinafter described.

Below the bottom wall 27 of tank 23 and to one side of pedestal 17, the closet is formed to provide a forwardly extending passage 33 which communicates with a port 34 in the side of bowl 16, this port being below the level of the water seal in the bowl. The passage 33 is also connected with an upwardly extending overflow tube 35 formed integrally with the rear wall 25, this tube rising to a point slightly above the normal level of the body of flushing water retained within the tank for flushing the bowl. The normal level of water in the tank is indicated by the line W in FIGS. 2 and 3. Thus, should water rise to an abnormal height or above the line W, it could overflow through the tube 35 and passage 33 and escape by way of the bowl and trap.

Water within the tank 23 is discharged into the passage 33 through a discharge port 36 in the bottom wall 27 of the tank. This discharge port is normally closed by a flush valve 37 having the usual vertical stem 38 slidably arranged in a guide 40. The flush valve 37 is actuated by a flush lever 41 pivotally arranged on the upper front wall section 24 and manipulated by a handle 42. A link 43 connects the free end of lever 41 with the upper end of the stem 38 in the usual manner.

Referring to FIG. 3, water is supplied to the tank 23 and flushing rim 30 by interconnected means which are shown as including a water inlet pipe or riser 44, a ball cock 45, and a hollow antisiphon body 46 including an adjustable volume control valve 47 and the inventive diverter valve assembly 48 and water silencer device 50, to be hereinafter described.

The water inlet pipe or riser 44 is shown as arranged at one corner of the tank 23 adjacent the rear wall 25 thereof and has its lower end extending through an opening 51 provided in the bottom wall 27 of the tank. The lower end of the riser is shown as provided with an externally threaded shank 52 and a rubber washer 53 and lock nut 54 are arranged on the shank below the bottom wall and bearing thereagainst. Any suitable main water supply pipe (not shown) may be connected to shank 52.

The riser pipe 44 is preferably arranged in a conduit or tubular channel which keeps the water in the tank out of contact with this riser pipe. The conduit or channel is formed by an angular imperforate dam wall 55 connected with one side wall 26 and the rear wall 25 of tank 23. The dam wall terminates at its upper end in a horizontal top wall 56, both walls being preferably formed of vitreous china and made integral with the tank 23. The top of this conduit is preferably above the level of the rim 30 so that the bowl 16 will spill water before water in the tank would tend to overflow into the conduit. As will be seen hereinafter, the conduit is effectively sealed to prevent any overflow of water into it in any event. Thus, the riser pipe 44 which is carrying the potable water supply is constantly kept out of contact with the body of water in the tank 23 under all conditions, so that if the tank water is contaminated it cannot leak into the riser pipe through any cracks or defects therein. The top wall 56 of the conduit is provided with an opening 57 to facilitate communication between the riser pipe 44 and ball cock 45, and the bottom wall 27 of the tank within the conduit is provided with a drainage hole 58. Thus, if the riser pipe 44 leaks, the escaping water will run onto the floor through the drainage hole 58 and this should attract attention that the closet needs inspection and repair.

The upper end of riser pipe 44 is suitably connected to the valve body 60 of the ball cock 45, which body protrudes downwardly through opening 57 in the upper conduit wall 56, and this joint is effectively sealed by rubber washer 61. By tightening the nut 54 on the threaded shank 52, the ball cock 45 is drawn downwardly into stable, cushioned and sealed seating arrangement on the top wall 56.

The ball cock 45 includes a plunger assembly 62 which slides vertically within valve body 60 with respect to the tubular valve seat 63 secured therein. The plunger 62 is operated by the usual float 64 and linkage assembly 65 for opening and closing the ball cock, as also seen in FIG. 1.

The ball cock body 60 is provided with an outlet passage 66 which is suitably connected to an inlet passage 67 formed in the anti-siphon body 46 and leading into a control valve chamber 68 in which a volume control valve 47 is adjustably mounted.

An important embodiment of the invention is the diverter valve assembly including body 46 which has a cylindrical chamber 70 formed therein. This chamber is open at one end and provided with the following circumferentially spaced ports: the inlet port 71 leading from the control valve chamber 68, the rim flush port 72 which is formed in a nozzle portion 73 of the body and leads into the conduit 32 connected to the bowl rim 30, and the downwardly open discharge port 74 leading into the tank 23.

Figures 5, 6, 7:
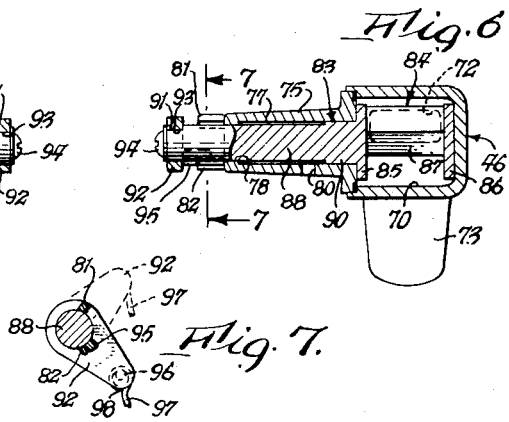
FIG. 5 is an elevational sectional view taken on line 5—5 of FIG. 3 and illustrating the chamber-forming body, rotary valve head and spindle, and cantilever bearing housing of the inventive diverter valve assembly, as well as the upper portion of the inventive silencer device.
FIG. 6 is a sectional view similar to FIG. 5, but taken on line 6—6 of FIG. 3, and also illustrating the lever arm on the valve spindle, together with the lever arm lug and the lugs on the cantilever bearing housing for limiting the rotative movement of the diverter valve.
FIG. 7 is an elevational sectional view taken on line 7—7 of FIG. 6 and illustrating in solid lines the position of the lever arm when the rim flush is partially closed by the diverter valve head, and in dotted lines the position of the lever arm when the rim flush is open.

As shown in FIGS. 1 and 2, the open end of chamber 70 is closed by a cantilever bearing housing 75 which is attached to body 46 by any suitable means such as screws 76. Referring to FIGS. 5–7, housing 75 is provided with a bore 77 axially alined with chamber 70, the bore 77 terminating at its outer end in a reduced shoulder 78 which forms an outer bearing portion. The lower peripheral portion of housing 75 is provided with a substantially radially extending slot 80, and the outer end of the housing is provided with circumferentially spaced axial lugs 81 and 82, all for a purpose to be hereinafter described.

The diverter valve assembly is completed by a rotary diverter valve generally indicated at 83 in FIGS. 5, 6 and 9, and including a head 84 arranged within chamber 70 and formed by the spaced circular disks 85, 86 which are connected at their outer peripheries by a cylindrical sector-shaped plate 87. A spindle 88 is preferably formed integrally with head 84, being provided at its inner end with an enlarged shoulder 90 forming an inner bearing portion and at its outer end with a flat 91. As also shown in FIGS. 7, 9 and 10, lever arm 92 is mounted on the outer end of spindle 88 and has a bore provided with a complementary flat 93 engaging flat 91 so that the lever arm will rotate with the spindle, the lever arm being secured in place by a washer head screw 94. This arm is also provided with an inwardly extending lug 95 which is selectively engageable with lugs 81 and 82, and with an outwardly extending pivot pin 96. The lever arm 92 is connected with the flushing mechanism by a link 97 which has a hook 98 at its upper end rotatably surrounding pivot pin 96, and an offset portion 100 at its outer end which passes through an opening 101 provided in the flush lever 41, as shown best in FIGS. 1 and 2.

Thus, when the handle 42 is actuated to flush the closet, the flush valve 37 and stem 38 are raised in the usual manner by the flushing lever 41, whereby the water flows from the tank 23 through discharge outlet 36 into bowl 16 and thence outwardly through the trap. At the same time, the float 64 is lowered with the level of the water, thereby causing the float linkage 65 to open ball cock 45 and permit the supply water to pass from the riser pipe 44 through the ball cock 45 and past the control valve 47 into chamber 70 in body 46. Simultaneously, the flush lever 41 lifts the link 97 which causes the lever arm 92 to rotate the diverter valve 83 from the solid line to the dotted line position of FIG. 3. As a result, most of the supply water passes from inlet 71 into chamber 70 and outwardly through open rim flush port 72 to rim 30, the remainder of the supply water passing downwardly through the tank discharge port 74 in sufficient quantity to prevent aspiration of air into this port, and being further controlled in a manner to be hereinafter described.

During this flushing operation, the flush valve 37 floats on the water in tank 23 until the water level reaches a predetermined minimum level, whereupon the flush valve reseats in discharge port 36, thereby causing link 43 to pivot flush lever 41 and link 97 downwardly to their original positions, as shown in FIGS. 1 and 2. This causes the lever arm 92 and diverter valve 83 to rotate from the dotted line to the solid line position of FIGS. 3 and 7. Thus, the sector plate 87 of the diverter valve head 84 substantially closes the rim flush port 72 and causes substantially all of the supply water entering chamber 70 to pass outwardly through tank discharge port 74. The water flows in this manner until the tank is once again filled, whereupon the float operated linkage 65 closes ball cock 45 to shut off the supply water.

Referring particularly to FIGS. 3, 5 and 6, it will be noted that the diverter valve head 84 fits rather loosely within chamber 70, and thus the sector plate 87 and circular disks 85, 86 do not contact the inner periphery of chamber 70, the only contact being that between the outer face of disk 86 and the adjacent end wall of chamber 70. As a result, a sufficient amount of water is permitted to leak past sector plate 87 into rim flush port 72 when head 84 is in the solid line position of FIG. 3, thereby supplying the necessary amount of water to refill or reseal the bowl 16. Moreover, the valve head 84 is adequately lubricated by the supply water and this, together with the elimination of most of the metal-to-metal contact makes for a much longer operating life of the valve head. In addition, the axially spaced bearing portions formed by reduced shoulder 78 in housing 75 and enlarged shoulder 90 on spindle 88 not only minimize the metal-to-metal contact between the housing and the spindle, but also provide a space between the bearing portions forming a reservoir for lubricating water which can seep outwardly from chamber 70 between the housing and the spindle. This cantilever arrangement simplifies the construction of the body 46 and chamber 70 therein by eliminating a second spindle and bearing support for the free end of valve head 84. In addition, the peripheral slot 80 in housing 75 is conveniently arranged between the spindle bearing portions 78 and communicates with housing bore 77 to permit escape of any excess lubricating water within the housing.

Another important feature of the diverter valve assembly is constituted by the circumferentially spaced lugs 81, 82 on the outer end of housing 75, and the complementary lug 95 on spindle lever arm 92. These lugs cooperate and act as stops to limit the movement of valve 83 so that the sector plate 87 in the valve head 84 will be properly positioned either to open or substantially close rim flush port 72. A further important feature of this valve assembly is the constantly open and unrestricted condition of tank discharge port 74, regardless of the position of diverter valve 83. Thus, back siphonage of water from the tank into the valve assembly is positively prevented by such construction. Moreover, it will be noted that the diverter valve assembly 48 is so constructed that it can be easily and quickly assembled and disassembled, as well as readily attached to and detached from body 46. This facilitates repair or replacement of any of the parts of the assembly.

Figure 4:
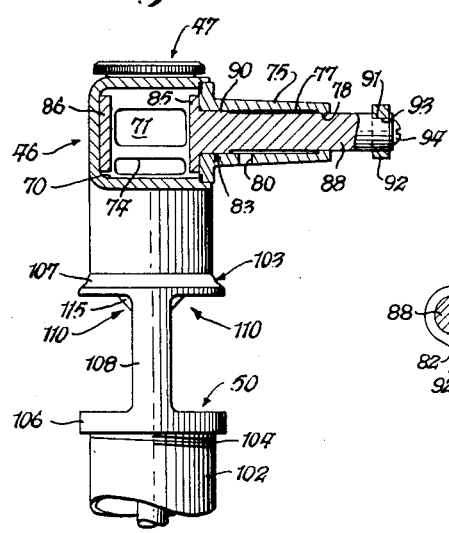
FIG. 4 is an elevational sectional view on a reduced scale and illustrating the entire silencer device partially shown in FIG. 3.

Referring now to FIGS. 3 and 4, the other embodiment of the invention, and forming a most important part thereof, is the device for silencing the water flowing from body 46 into tank 23. This silencer device is generally indicated by the numeral 50 and includes the elongated and circular cylindrical, upright hush tube 102 which extends upwardly from a position slightly spaced above bottom wall 27 of the tank, but below the normal minimum water level in the tank. At its upper end, hush tube 102 is preferably provided with a cylindrical tubular cage 103, which may be made integral with the tube but is preferably a separate element having internal threads 104 at its lower end engaged by external threads 105 on tube 102. The cage is actually formed of a lower ring 106 and an upper ring 107 which are connected by diametrically opposed sector plates 108, thereby forming two enlarged peripheral openings 110 which provide an anti-siphoning air gap to be described in more detail below. The upper end of upper ring 107 of the cage is provided with an externally threaded neck 111 which is threaded into the internally threaded outlet end 112 of tank discharge port 74 in body 46. It will also be noted that the inner diameter of upper ring 107 is substantially less than the inner diameter of hush tube 102 and is provided with a reduced shoulder 113 which forms a reduced entrance into the cage 103 and hush tube 102.

The silencer device is completed by an elongated cylindrical silencer rod 114 which is centered in hush tube 102. Rod 114 is preferably molded out of polyethylene and is provided with means for dividing the water flowing into the hush tube into a plurality of substantially parallel streams, and means for momentarily dispersing the divided water flow from a downward to a laterally diverging direction. The water dividing means, as also shown in FIG. 8, are preferably constituted by six radially diverging fins 115 formed integrally with rod 114 adjacent its upper end. These fins 115 are circumferentially spaced at their outer ends at equal intervals around rod 114 and fit snugly within neck 111 of cage 103 to center the upper end of rod 114 in the hush tube. Adjacent their lower ends 116, the fins 115 are provided with reduced shoulders 117 which mate with shoulder 113 in the upper ring 107 which shoulder therefore acts as a seat for the fins and prevents the rod 114 from being forced downwardly through the hush tube 102 by the pressure of the supply water. In addition, the lower ends 116 of fins 115 are conically tapered to strengthen the fins against any tendency to shear off rod 114, and to induce the water to flow downwardly and inwardly toward and thence along the rod rather than drop off the fins and splash into the tank. This is particularly true during closure of the ball cock when water delivery is small.

The water dispersing means is preferably constituted by a pair of circular collars 118 and 120 which are spaced longitudinally below the openings 110 in cage 103 and from each other. The upper collar 118 is provided with a slightly concave upper surface 121 which acts to reverse direction of the water striking the face as well as to cause the water to flow laterally outwardly for a purpose to be described hereinafter. The lower surface 122 of collar 118 is conically tapered to provide sufficient strength to resist any tendency of the collar to be sheared from rod 114 by the pressure of the downwardly flowing water, and to induce the water to follow the rod rather than splashing into the tank.

The rod 114 is provided with a reduced lower end portion 123 which has an externally threaded upper part 124 which is engaged by the internally threaded bore 125 provided in lower collar 120. The upper surface 126 of collar 120 is substantially flat and radial to disperse the downwardly flowing water to a laterally diverging flow, the lower surface 127 is conically tapered for strength, and for inducing the water to follow the lower end portion 23 of the rod, rather than splashing into the tank, and the outer periphery of collar 120 is provided with three circumferentially spaced lugs 128 which engage the inner periphery of tube 102 in order to center the lower part of rod 114 in the tube. It is important that the rod be centered in hush tube 102 so that the water flowing through the tube will be divided and dispersed uniformly for optimum results.

In assembling the silencer device 50, the rod 114 is first inserted into cage 103. Next, the lower collar 120 is threaded onto the rod, and then the cage 103 is connected to the hush tube 102. As will be apparent, this is a relatively simple procedure, and the components of the silencer device are designed to facilitate such assembly and disassembly. In attaching the silencer device 50 to the anti-siphon body 46, it is merely necessary to thread the hub 111 of cage 103 into the internally threaded lower portion 112 of discharge port 74. Thus, the entire silencing device may be readily removed from the water supply system and quickly disassembled for repair or replacement of any of its parts, whenever necessary.

During flushing of closet 15 and filling of tank 23, supply water is always flowing through tank discharge port 74 although a greater amount of water is flowing through this port during refilling the tank. This water is also flowing at a substantially rapid rate through the water supply system, and because of the numerous changes of direction of the supply water path as it passes through ball cock 45, control valve chamber 68, inlet 71, and chamber 70 into discharge port 74, a substantial amount of turbulence is created. This in turn would result in considerable noise were the water permitted to flow freely into the tank in such a turbulent condition.

The silencer device of the invention effectively overcomes this objectionable noise in the following manner. First of all, the fins 115 on rod 114 in effect "straighten out" the water, by dividing the flow into a plurality of substantially parallel streams which closely approximates laminar flow. It has been found that by dividing the water into six evenly divided streams, the desired laminar effect is obtained, and that by making the entrance to cage 103 smaller in diameter than the inner diameter of tube 102, and by tapering the lower ends 116 of the fins, the streams of water will readily follow along rod 114 and pass through the cage into the hush tube without splashing outwardly through openings 110 in the cage and spilling noisily into the tank on the outside of the hush tube. In addition, the upper collar 118 provides a substantial restriction in hush tube 102 and the concave upper surface 121 of this collar not only causes the divided water to be dispersed laterally, but actually stops the downward flow momentarily and for at least an instant, reverses the direction of flow, while its tapered lower surface 122 induces the water to follow down the rod. Thus, the tendency of the water to rush downwardly through cage 103 at a rapid rate under the influence of gravity and to pick up air through the openings 110 in the cage, together with objectionable noises produced by such action, are minimized. The lower collar 120 provides a further restriction in tube 102, and by causing the water to be dispersed laterally once again, as well as to flow along its tapered lower surface 127 and the lower rod portion 123 considerably reduces any impact between the water leaving the hush tube and the water already in the tank, thereby substantially eliminating objectionable turbulence and noise at this point as well.

The silencer device 50 also provides the additional important function of preventing siphoning of water from tank 23 back into the water supply system because of the air gap formed by the openings 110 in cage 103. This effectively breaks down any vacuum which might possibly form in the silencer device, and to insure the effectiveness of this anti-siphoning function, the body 46 and cage 103 are located above the top of the overflow tube 35, so that the water in the tank will flow into this overflow tube rather than into the hush tube 102 through the openings 110 in cage 103.

It will now be apparent how the invention accomplishes its various objects, and it is to be understood that various changes and modifications in the above described embodiments of the invention may be made by those skilled in the art without departing from the spirit of the invention, the scope of which is to be defined by the appended claims. For example, the invention is not limited to use in a floor mounted water closet such as shown and described, but is also readily adapted for use in a wall hung type of closet as well.

What is claimed is:

1. In a water supply system for a water closet including a water storage tank and a body arranged in said tank above the normal water level therein and having a downwardly open discharge port, the combination therewith of a device for silencing the water flowing downwardly from said body into said tank, said device comprising an elongated circular cylindrical upright hush tube connected at its upper end to said discharge port and having a cage forming peripheral openings above said normal water level to provide an anti-siphoning air gap and means forming a seat and defining a reduced entrance in the upper end of said tube to prevent the water flowing into said cage from escaping through said peripheral openings, and an elongated circular cylindrical rod arranged in said tube and having a plurality of radially diverging fins supported against lateral movement on said seat for dividing the water flowing into said cage from said discharge port through said entrance into a plurality of substantially parallel streams and for centering the upper end of said rod in said tube and a pair of circular collars spaced below said peripheral openings and from each other for momentarily dispersing the divided water flow in said tube from a downward to a laterally diverging direction, the lower collar having circumferentially spaced lugs engagable with said tube for centering the lower end of said rod therein, the lower ends of said fins and the lower surfaces of said collars being tapered inwardly to induce the water to flow downwardly and inwardly toward and thence along said rod.

2. A device for silencing water flowing into the water storage tank of a water closet, said device comprising an elongated circular cylindrical hush tube having a cage forming peripheral openings adjacent one end of said tube to provide an anti-siphoning air gap and means forming a seat and defining a reduced entrance in said one end to prevent the water flowing into said cage from escaping through said peripheral openings, and an elongated circular cylindrical rod arranged in said tube and having a plurality of radially diverging fins supported against lateral movement on said seat for dividing the water flowing into said cage through said entrance into a plurality of substantially parallel streams and for centering one end of said rod in said tube and a pair of circular collars spaced longitudinally inwardly from said peripheral openings and from each other for momentarily dispersing the water flow from a longitudinal to a laterally diverging direction, the collar farthest from said peripheral openings having circumferentially spaced lugs engageable with said tube for centering the other end of said rod therein, the lower ends of said fins and the lower surfaces of said collars being tapered inwardly to induce the water to flow downwardly and inwardly toward and thence along said rod.

References Cited in the file of this patent

UNITED STATES PATENTS

| | | |
|---|---|---|
| 630,315 | Barclay | Aug. 8, 1899 |
| 1,249,837 | Scheer | Dec. 11, 1917 |
| 1,313,831 | Owens | Aug. 19, 1919 |
| 1,649,620 | Siefen | Nov. 15, 1927 |
| 1,843,462 | Scott | Feb. 2, 1932 |
| 1,901,633 | Clemmons | Mar. 14, 1933 |
| 1,976,442 | Finn | Oct. 9, 1934 |
| 2,229,600 | Park | Jan. 21, 1941 |
| 2,274,862 | Groeniger | Mar. 3, 1942 |
| 2,444,958 | Smith | July 13, 1948 |
| 2,581,043 | Owens | Jan. 1, 1952 |
| 2,621,886 | Mueller | Dec. 16, 1952 |
| 2,722,229 | Wentz | Nov. 1, 1955 |
| 2,738,851 | Warch | Mar. 20, 1956 |